US005964446A

United States Patent [19]

Walton et al.

[11] Patent Number: 5,964,446

[45] Date of Patent: Oct. 12, 1999

[54] ELASTOMERIC ELEMENT VALVE

[75] Inventors: Herbert H. Walton, Marshalltown; Douglas C. Pfantz, Melbourne; Gary L. Scott, Marshalltown; William J. Bonzer, Marshalltown, all of Iowa

[73] Assignee: Fisher Controls International, Inc., Clayton, Mo.

[21] Appl. No.: 08/914,555

[22] Filed: Aug. 19, 1997

Related U.S. Application Data

[60] Provisional application No. 60/024,415, Aug. 21, 1996.

[51] Int. Cl.[6] .............................. F16K 7/12; F16K 31/126

[52] U.S. Cl. ......................... 251/127; 251/118; 251/61.1; 137/556

[58] Field of Search .................................... 251/61.1, 331, 251/359, 61.2, 61.4, 118, 123, 127; 137/556

[56] References Cited

U.S. PATENT DOCUMENTS

| | | | |
|---|---|---|---|
| 297,066 | 4/1884 | Coale . | |
| 353,062 | 11/1886 | Hill . | |
| 452,230 | 5/1891 | Meady . | |
| 993,831 | 5/1911 | Junggren . | |
| 1,461,039 | 7/1923 | Leslie . | |
| 1,793,396 | 2/1931 | Haentjens | 251/331 X |
| 1,896,833 | 2/1933 | Bramsen et al. . | |
| 1,949,150 | 2/1934 | Eplett . | |
| 1,976,851 | 10/1934 | Landis . | |
| 1,987,974 | 1/1935 | Richardson . | |
| 2,066,554 | 1/1937 | Bowen . | |
| 2,074,240 | 3/1937 | Saunders . | |
| 2,283,369 | 5/1942 | Jacobsen . | |
| 2,342,347 | 2/1944 | Jacobsen . | |
| 2,427,441 | 9/1947 | Butts . | |
| 2,505,613 | 4/1950 | Farris . | |
| 2,537,308 | 1/1951 | Hansen . | |
| 2,564,287 | 8/1951 | Stephany . | |
| 2,621,015 | 12/1952 | MacGregor . | |
| 2,649,273 | 8/1953 | Honegger . | |
| 2,715,418 | 8/1955 | Derbeck . | |
| 2,888,234 | 5/1959 | Dahl . | |
| 2,916,255 | 12/1959 | Koenler . | |
| 2,988,322 | 6/1961 | Anderson . | |
| 3,011,752 | 12/1961 | Stone . | |
| 3,011,758 | 12/1961 | McFarland, Jr. . | |
| 3,034,761 | 5/1962 | Janquart . | |
| 3,067,764 | 12/1962 | Geary . | |
| 3,083,943 | 4/1963 | Stewart, Jr. et al. . | |
| 3,084,707 | 4/1963 | Frye . | |
| 3,091,427 | 5/1963 | Boteler . | |

(List continued on next page.)

FOREIGN PATENT DOCUMENTS

| | | | |
|---|---|---|---|
| 2422086 | 11/1979 | France . | |
| 57-107469 | 7/1982 | Japan | 251/118 |
| 898777 | 6/1962 | United Kingdom . | |
| 1149405 | 4/1969 | United Kingdom . | |
| WO 9514874 | 6/1995 | WIPO . | |

OTHER PUBLICATIONS

Fisher–Rosemount Instruction Manual Mar. 1996—Type 399A Pilot Operated Pressure–Reducing Regulator.
Francel Asonex D Regulator Valve.
American Meter Company—RFV Radial Flow Valves.
RMG 502 Regulator Valve.
Mooney Regulator Valve.

*Primary Examiner*—Kevin Lee
*Attorney, Agent, or Firm*—Marshall, O'Toole, Gerstein, Murray & Borun

[57] ABSTRACT

A fluid control valve having a valve body, a cage, and a flexible elastomeric diaphragm with a formed convolution to fully open the cage opening. An elastomeric diaphragm regulator with a flow diverter in the fluid flow path to reduce fluid flow separation and thereby reduce the required flow recovery area before pressure throttling. A raised knife edge seat located on the cage top in a position of stagnant fluid flow to reduce the build-up of contaminants on the seat. An elastomeric diaphragm regulator with a valve actuator coupled to a guided valve stem attached to the regulator diaphragm.

21 Claims, 9 Drawing Sheets

U.S. PATENT DOCUMENTS 3,098,642 7/1963 Kucmerosky et al. .
3,103,342 9/1963 Boteler .
3,123,092 3/1964 Kmiecik et al. .
3,123,336 3/1964 Price .
3,154,286 10/1964 McFarland, Jr. .
3,157,383 11/1964 Price .
3,286,979 11/1966 Brown et al. .
3,310,279 3/1967 Boteler .
3,393,702 7/1968 Ferrill .
3,414,235 12/1968 Lumpp .
3,762,681 10/1973 McKinney et al. .
3,856,046 12/1974 Brown et al. .
4,029,296 6/1977 Hartmann et al. .
4,181,151 1/1980 Ensign .............................. 251/61.1 X
4,240,606 12/1980 Johnson .
4,324,276 4/1982 Kemner .
4,416,301 11/1983 Brumm .
4,515,179 5/1985 Edmunds et al. .
4,579,147 4/1986 Davies et al. .
4,619,436 10/1986 Bonzer et al. .
4,624,442 11/1986 Duffy et al. .
4,630,641 12/1986 Lacour .
4,671,321 6/1987 Paetzel et al. .
4,715,578 12/1987 Seltzer .
4,717,117 1/1988 Cook .
4,720,079 1/1988 Iizuka et al. .
4,765,364 8/1988 Arcari .
4,766,924 8/1988 Lee, III et al. .
4,774,984 10/1988 Peters .
4,893,782 1/1990 Franke .
5,027,857 7/1991 Champseix .
5,116,019 5/1992 Rohweder et al. .
5,201,492 4/1993 Beauvir .
5,217,043 6/1993 Novakovi .
5,271,601 12/1993 Bonzer et al. .
5,288,052 2/1994 Black et al. .
5,294,093 3/1994 Huveteau et al. .................. 251/331 X
5,383,646 1/1995 Weingarten .
5,456,281 10/1995 Teay .
5,535,987 7/1996 Wlodarczyk .
5,549,134 8/1996 Browne et al. .
5,725,007 3/1998 Stubbs ................................ 251/359 X FIG. 7
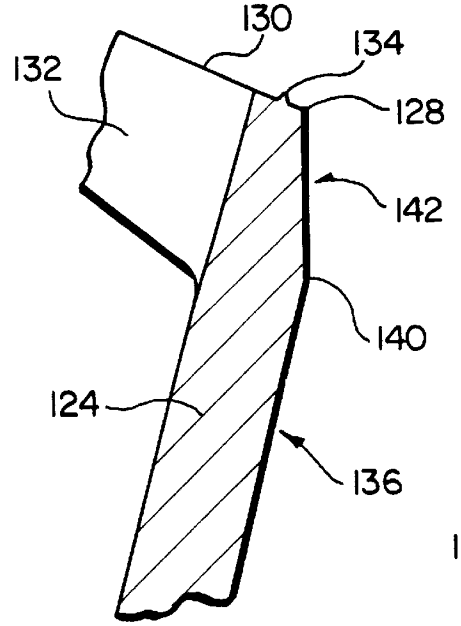
FIG. 8
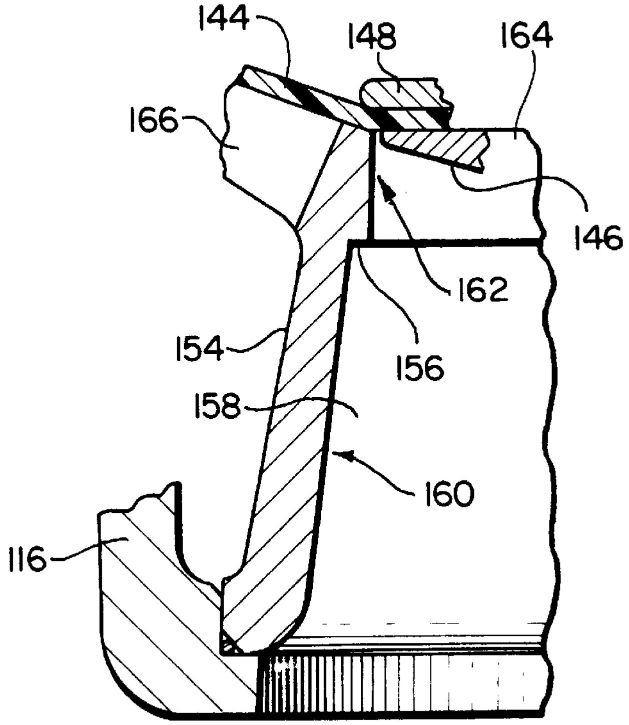
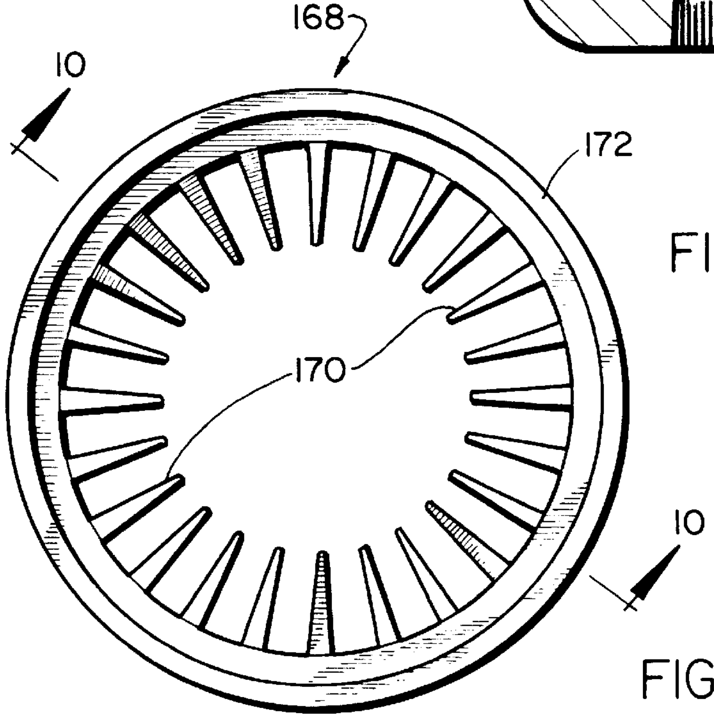
FIG. 9
FIG. 10
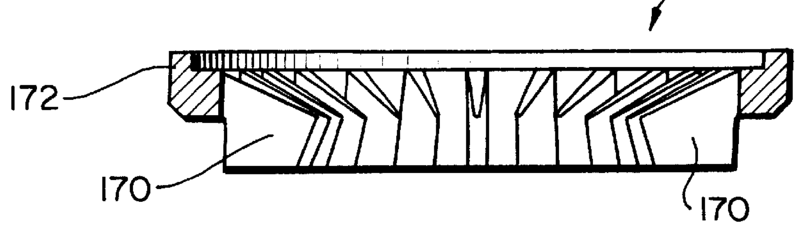

ELASTOMERIC ELEMENT VALVE

This application claims the benefit of U.S. Provisional Application Ser. No. 60/024,415, filed Aug. 21, 1996.

This invention relates to fluid control valves and in particular to pressure regulators or throttling valves including an elastomeric diaphragm element sealing a regulator orifice for flow control.

BACKGROUND OF THE INVENTION

Fluid control regulators, such as gas pressure regulators are in common use in gas pipeline systems to assist in maintaining system pressure within acceptable limits. As an example, the primary function of a gas pressure regulator is to match the flow of gas through the regulator to the demand for gas placed upon the system. Also, the pressure regulator must maintain the system pressure within acceptable limits.

In one type of such gas pressure regulator, a cage is inserted between the regulator fluid input and output ports with a diaphragm assembly being under a spring load to seat against an orifice at the top of the cage. Unreliable fluid sealing has been noted occasionally in this configuration, particularly at low fluid flow conditions.

In some such prior regulators, the diaphragm assembly contains several elements of complicated structure leading to a larger than desired regulator package which also is expensive to manufacture. In other such prior regulators, the diaphragm assembly has been reduced to a minimum of components utilizing a flat plate across the top of the cage and over the orifice opening. However, in such prior regulators the orifice is not substantially open and the flow path is obstructed even when the diaphragm is in the fully opened position above the orifice, thus reducing the regulated flow through the regulator. This undesired configuration leads to lower regulator flow capacity than desired.

It is desired therefore to provide a fluid control regulator having a diaphragm assembly which accommodates a high flow capacity in a small regulator package, and contains few components so as to reduce manufacturing and assembling costs.

SUMMARY OF THE INVENTION

A fluid control regulator including a valve body having a fluid input and a fluid output and a flow passageway therebetween. A cage element is inserted within the flow passageway and is adapted to permit flow through the cage and a top orifice between the regulator fluid input and output. A diaphragm assembly is movably mounted above the cage orifice to regulate fluid passing between the regulator input and output.

The diaphragm assembly includes an elastomeric diaphragm ring element circular in shape and having a flat central portion bounded by a formed convolution which in one embodiment is provided by a ridged annular diaphragm portion being joined together by a concave perimeter. In another embodiment the formed convolution is provided by a raised annular ridge in the diaphragm joining together the flat central portion and a flat mounting perimeter. The elastomeric diaphragm element is formed of a nitrile type material or other such elastomeric material.

In the regulator closed position the flat central portion of the diaphragm extends across the cage top to close the regulator orifice and prevent the flow of fluid through the passageway and through the regulator input and output. In response to regulator operation requiring the opening of the orifice, the elastomeric diaphragm element is flexibly moved away from the cage top with the concave perimeter switching to a convex perimeter, or the raised ridge portion straightening out in the second embodiment, and, in both cases, enabling the regulator orifice to be fully opened. Providing a full opening of the orifice allows the regulator to handle a high capacity of fluid pressure as compared to prior regulator devices of this type.

A diaphragm mounting ring includes an exterior surface matching the annular ridged portion of the diaphragm ring in the seated position. On the opposite side of the diaphragm, the regulator bonnet includes a diaphragm mounting flange having an interior surface which is contoured to match the diaphragm ring when the ring is flexed to the fully open position and the diaphragm concave perimeter has been switched to a convex perimeter, or the raised annular ridge straightens out.

The improved diaphragm assembly of the present invention is supported at its center with a diaphragm head on one side and a flat diaphragm plate on the other side to provide a seat load through a conventional plug/spring load configuration in for instance an unloading regulator. The diaphragm head also serves as a flow deflector to prevent diaphragm erosion and to increase capacity. As an alternative, the center diaphragm support can be drilled to provide a balancing port for a loading/actuated style regulator to provide a balanced plug curtain style valve. Therefore, the pressure regulator with an elastomeric diaphragm assembly of the present invention enables the production of a high capacity, small package, in-line maintenance regulator valve that is adaptable for both loading and unloading actuation.

In a preferred embodiment of the invention, a fluid control valve, such as a throttling valve, includes a valve body having a fluid inlet, a fluid outlet, and a fluid passageway therebetween. A cage member includes a cage interior receiving fluid at one cage end and a cap at the other cage end having cap openings in fluid communication with the cage interior. The cage member is mounted within the valve body fluid passageway for passing fluid from the valve body fluid inlet through the cage interior, and continuing through the cap openings to exit from the valve body fluid outlet. A flexible diaphragm is mounted in the valve body and flexibly movable from adjacent the cap openings to move away from the cap openings in controlling the flow of fluid between the valve body fluid inlet and the fluid outlet. Flow diverter means within the cage interior reduce the separation of the fluid flow which is passing between the cage top end and the cap openings so as to reduce the required flow recovery area as the fluid flow exits the top cage end and then enters the cap openings on the way to the valve body fluid outlet.

In one embodiment, the flow diverter means is provided by a decreasing cage interior volume as viewed by the fluid flow progressing from the cage inlet at the bottom of the cage to the cage outlet, and followed by a substantially constant cage interior volume as the flow continues to exit the top of the cage. This decreasing cage interior volume followed by a substantially constant cage interior volume portion tends to make the fluid flow curve around the top of the cage with a minimum of flow separation so as to reduce the amount of flow recovery area normally required prior to the fluid entering the cap openings. In another embodiment, a flow diverter is provided by a decreasing cage interior volume portion as the fluid flow progresses from the bottom of the cage towards the top of the cage, followed by a ledge projecting into the cage interior and with the projection continuing to the top cage end, either as a sharp ledge or as a more rounded ledge. In either event, this alternative flow diverter reduces the fluid flow separation as the fluid passes out the top cage end and goes towards and finally enters the cap openings. The ledge can also include a substantially constant cage interior volume in continuing to the top of the cage.

A raised seat is provided on the cage cap and is situated between the cage top end where the fluid flow exits the cage and the cap openings. Preferably, the raised seat is located at a position of low turbulence and of low velocity, in a stagnant flow region. This enables the sealing of the raised seat by the diaphragm to be more reliable under all flow conditions, including low flow conditions which caused fluid sealing reliability problems in prior regulator valves. In addition, because of the flow diverter means reducing flow separation around the throttling area, the seat can be efficiently located so as to avoid the loss of regulator flow capacity which was required in prior devices. Furthermore, the flow diverter means enables the location of a desired sharp raised seat or knife edge seat in an area on the cage cap so as to significantly reduce the build-up of contaminants on the seat.

A retaining ring engages the cap for mounting the cage in the valve body. The retaining ring can be a hollow ring enabling full fluid flow therethrough, or can include flow blocking fingers in the ring interior which fingers can mate with the cap openings to desirably reduce the flow capacity of the regulator. In this manner, one cage can be used with any number of capacity alternatives by simply changing the retainer ring to a respective ring having none or a varying plurality of flow blocking fingers. Alternatively, the retaining ring could be incorporated with the cage in a single casting.

A center diaphragm support is mounted to the diaphragm central portion and includes a lower diaphragm plug-like head and an upper flat diaphragm plate with the diaphragm central portion sandwiched therebetween. Aspirator passageways extend through the center diaphragm support for communicating the loading chamber on one side of the diaphragm to the other diaphragm side.

In an alternative embodiment, the aforementioned regulator valve may include a noise attenuation device. The noise attenuation device is provided by a perforated member surrounding the cage and intermediate the fluid flow progressing from the cap openings to the valve body outlet so as to attenuate noise in the fluid flow. One or more of such perforated members can be mounted into position surrounding the cage to provide flow diffusion so as to reduce noise generated by turbulence, depending upon the level of attenuation desired.

A valve stem is engageably coupled to the center of the diaphragm so as to move the diaphragm towards and away from the cap openings, and passageways in the valve body accommodate and guide the valve stem during such movement. This guided valve stem configuration permits stabilizing of the diaphragm. Alternatively, instead of stem guiding, the diaphragm assembly can include a skirt portion movably guided within the valve body. A travel indicator having a scale also may be mounted to the valve body to cooperate with a marker on the valve stem to indicate the valve stem position and therefore the opening position of the valve.

In a further embodiment of the invention, the valve stem actuated diaphragm is attached to a conventional valve actuator wherein the moving forces are supplied through a loading pilot. Such a valve actuator and regulator combination in accordance with this invention can be reliably used for low differential pressure applications. In a self-operated version of the actuator/regulator combination, instead of the moving force supplied through a loading pilot, the controlled pressure can be obtained from the down-stream pressure.

The present invention solves many of the prior problems encountered in prior regulators using an elastomeric diaphragm and throttling cage element. In addition, the present invention provides many significant advantages, including the following:

A. "Plug Style" Elastomeric Regulator
- a. A diaphragm mounting plug provides a hard surface on the fluid inlet to avoid erosion by absorbing the high energy of particle impingement.
- b. The diaphragm plug along with the improved seat of the present invention provides longer seat life. The cage seat has a sharp seating surface. The cage seat is also provided for seating and not for a pressure drop, as the pressure drop is taken else where within the throttling cage, thus protecting the seat. The improved cage seat in combination with the diaphragm plug, provides longer seat life.
- c. The diaphragm plug with the guided valve stem enables the use of lighter weight diaphragms so as to lower the minimum pressure differential and reduce hysteresis error, thus improving control regulation over wider ranges.
- d. The diaphragm plug with the guided valve stem provides enhanced regulator stability over a pressure range.
- e. The diaphragm mounting assembly enables spring assisted fluid shut-off.
- f. Diaphragm mounting assembly enables the formation of a "cupped" diaphragm from a flat sheet, thus reducing the cost of the diaphragm and adding flexibility in the choice of diaphragms.
- g. Diaphragm mounting assembly and guided valve stem enables the use of a true travel indicator and/or with limit switches, etc., for indicating the true plug position in an elastomeric element device.

B. Throttling Cage
- a. The throttling cage is designed as a direct insert for the control valve body to convert the control valve to a regulator or to an elastomeric control valve.
- b. The flow diverter structure in the cage provides a "flow dam" for stability and to move the pressure drop region from the raised seat to other area so as to prolong seat life.
- c. The desirable sharp or knife edge seat in an elastomeric element style regulator is advantageously combined with the diaphragm plug.
- d. The cage retainer also acts as the diaphragm retainer. Also, the cage retainer can be used to selectively reduce flow capacity.
- e. The throttling cage has an integral seat. Also, the throttling cage can be combined with noise attenuating veins and can also incorporate a primary/secondary seat configuration if desired.

C. Elastomeric Diaphragms
- a. The flat diaphragm may be formed into a cupped shape utilizing the diaphragm mounting assembly.
- b. A flat diaphragm is easier to manufacture and can be made from special materials, i.e., carboxylated nitrile, viton, and others to enable versatility in applications.

In addition, the fluid control valve of the present invention can be: (1) used in gas or liquids; (2) used as a relief, back pressure, pressure reducing, or flow control valve (via differential on pilot) using a simple change of pilot; (3) can be remotely controlled utilizing the guided valve stem with appropriate coupling devices; (4) can incorporate a microprocessor controlled pilot; and (5) can incorporate an integral shut-off.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 7 is an enlarged fragmentary view of the top of the cage of FIG. 5 illustrating the flow diverter and the position of the raised seat;

FIG. 8 is a fragmented sectional view illustrating another embodiment of a flow diverter;

FIG. 9 is a plan view illustrating a cage retainer ring with flow capacity fingers mating with the cap openings of the cage in FIG. 6;

FIG. 10 is a sectional view taken along section line 10—10 of FIG. 9;

DETAILED DESCRIPTION

Figure 1:
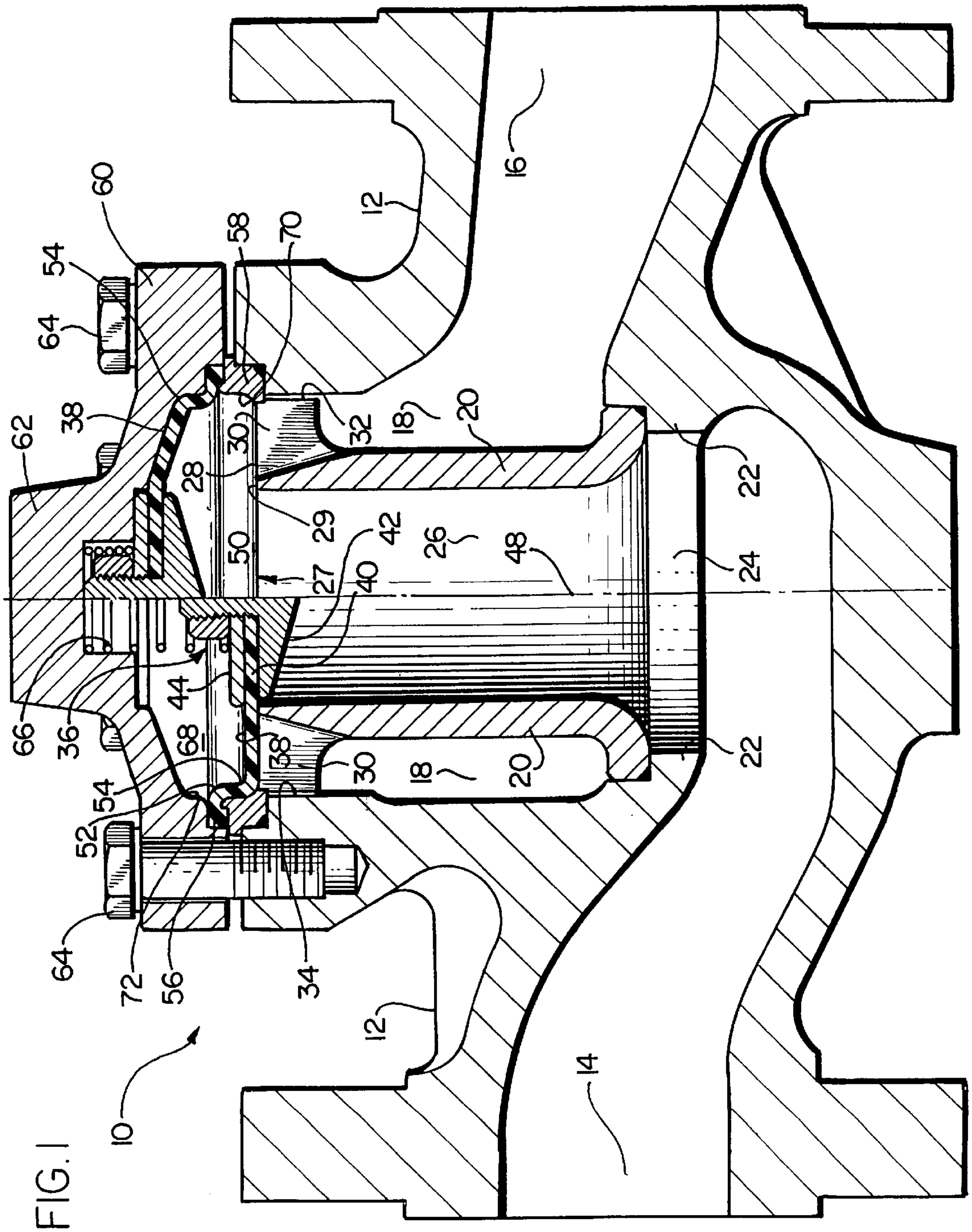
FIG. 1 is a sectional view of a fluid pressure regulator and elastomeric diaphragm assembly in accordance with the present invention with opposite sides of the regulator centerline showing respective operational positions for convenience of illustration.
Figure 2:
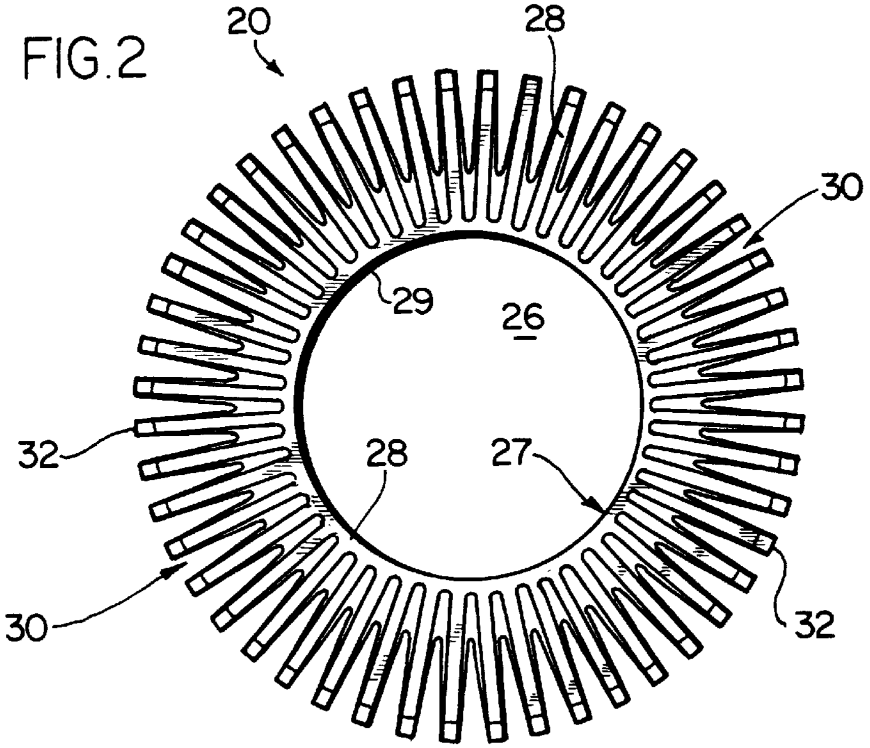
FIG. 2 is a plan view of the regulator cage of FIG. 1 illustrating the cage top and the cage outlet which is sealed by the diaphragm element.

FIGS. 1 and 2 illustrate one embodiment of the invention incorporating a unique elastomeric diaphragm assembly in a fluid pressure regulator. It is to be understood that whereas the specific illustration herein is in connection with a fluid pressure regulator of the unloading regulator type, the elastomeric diaphragm element also can be applied to loading regulator types of fluid pressure regulators.

Turning now to FIGS. 1 and 2, there is illustrated a fluid pressure regulator 10 including a regulator body 12 having a fluid inlet 14, a fluid outlet 16, and an interconnecting passageway 18 for communicating fluid from the inlet 14 through the regulator body 12 and to the outlet 16. For convenience in describing the invention, the left-hand side of the regulator is illustrated in the closed position, whereas the right-hand side is illustrated in the open position.

Within the passageway 18 in the regulator body 12, there is provided an elongated cage 20 with a bottom end mounted on an annular support shelf 22 encircling an aperture 24 which fluidly communicates the inlet 14 with a hollow cage interior 26 leading to a cage outlet 27. At the top of cage 20 there is provided a cap or end wall 28 having a series of openings in the form of open slot apertures 30 which apertures 30 together form a passageway for the fluid within the hollow cage interior 26 on one side of the cap or cage end wall 28 and the outlet fluid in passageway 18 on the opposite side of the cage end wall.

An outer edge 32 of the cage end wall 28 rests against an inner surface 34 of the regulator body 12 within the passageway 18 in a guide clearance that aids in vertical assembly of the components. The open slot apertures 30 thereby communicate fluid passing through the cage outlet 27 to the passageway 18 and eventually to the regulator outlet 16.

A diaphragm assembly 36 is provided for controlling the flow of fluid through the regulator orifice and includes an elastomeric diaphragm 38 having a central portion 40 substantially sandwiched between a diaphragm head 42 supporting the diaphragm on one side and a diaphragm plate 44 supporting the diaphragm on the opposite side. A nut 46 threadably mounts to a threaded upright portion of the diaphragm head 42 so as to securely maintain the elastomeric diaphragm 38 in position and to secure the components of the diaphragm assembly. The diaphragm plate 44 serves as a spring seat and is larger than the cage outlet 27 to provide a sealing of the outlet 27 at regulator lockup.

With reference to FIG. 1, it may be seen that there is illustrated for convenience on the left side of regulator centerline 48 the position of the diaphragm assembly 36 when sealed against a corner seat 29 of the cage end wall 28 to block the cage outlet 27. The portion of the end wall 28 having the open slot apertures 30 supports the diaphragm 38.

On the right side of the centerline 48 there is illustrated the position of the diaphragm assembly 36 during operation of the regulator to open the regulator orifice and enable the fluid flow to pass from regulator inlet 14 through aperture 24, through the hollow cage interior 26 and cage outlet 27 and into the diaphragm chamber 50, through the slot apertures 30 and into the passageway 18, and finally to the fluid outlet 16.

The elastomeric diaphragm 38 is preferably formed of nitrile and includes the flat central portion 40, an annular ridged portion 52, and a concave perimeter 54 joining the ridge 52 and the central portion 40. An outer mounting ring portion 56 is provided for mounting the diaphragm assembly 36 between a diaphragm mounting and cage retaining ring 58 and a diaphragm mounting flange 60 of a regulator bonnet 62. A series of hold down bolts 64 threadably engage the regulator body 12 for securely maintaining the bonnet 62 in position with the diaphragm assembly 36 therebetween. The cage mounting ring 58 is adapted to hold the cage 20 in position so as to form a diaphragm convolution for the required diaphragm travel, and to produce a metal/metal contact to carry the bolt load that prevents the diaphragm from crushing. If desired in certain regulator applications, the diaphragm 38 as shown herein may be utilized with a modification in the shape of the cage retaining ring 58 to provide a restricted flow capacity as will be described hereinafter with reference to the cage retaining ring of FIGS. 9 and 10. Suitable O-rings are provided between the bottom of the cage 20 and the support shelf 22 as well as between the diaphragm mounting and cage retaining ring 58 and the regulator body 12 as illustrated.

A spring 66 has one end seated against the bonnet interior and another end seated against the diaphragm plate 44. The spring 66 provides a seat load through the diaphragm plate 44 and the sharp corner seat 29 of the cage 20. Typically, in the unloading regulator 10, the spring 66 is set at a spring set pressure so that when the outlet pressure in regulator outlet 16 is below the spring set pressure, the diaphragm assembly 36 is in a position shown on the left side of the centerline 48 with the diaphragm 38 seated against the corner seat 29 of the cage end wall 28 to close off the regulator orifice. As is well known in the art, a pilot regulator (not shown) senses the outlet pressure at the outlet 16 and is fluidly coupled through the bonnet 62 into a loading chamber 68 on the opposite side of the diaphragm assembly 36 to enable the loading pressure to exhaust, thereby counteracting the spring 66 and opening the regulator orifice. This enables the inlet pressure at inlet 14 to be coupled to the regulator to the fluid outlet 16 and helps to maintain the regulation of the outlet pressure.

When the inlet pressure opens the regulator orifice, i.e. in going from the closed situation shown at the left-hand side of the centerline 48 in FIG. 1 to the fully opened position shown in the right-hand side of FIG. 1 it is desired that a large fluid flow through the regulator can be accommodated. As can be seen from the right side of the centerline 48 in FIG. 1, in regulator 10, the elastomeric diaphragm ring 38 can flexibly move outwardly away from the cage end wall 28 to a fully opened position affording a large diaphragm chamber 50 which can accommodate a large flow capacity and thereby enable the regulator to be utilized for a wider range of flow applications than with prior devices. In particular, it may be noted that the elastomeric diaphragm ring 38 has a formed convolution which includes the concave portion 54 at its perimeter so that when the valve is opened the concave portion 54 becomes convex as shown in the right side of FIG. 1. Thus, a full regulator orifice opening affording a substantially unobstructed flow path is obtained with a minimum size elastomeric diaphragm element.

The diaphragm mounting ring 58 includes an inner surface 70 which is contoured to match the concave portion 54 as well as the annular ridged portion 52 of the elastomeric diaphragm ring 38 as shown on the left side of centerline 48. Also, the regulator bonnet 62 includes an inside surface 72 which is contoured to match the elastomeric diaphragm ring 38 as the concave portion 54 switches to become convex upon regulator orifice opening as shown on the right-hand side of the centerline 48 in FIG. 1.

The elastomeric diaphragm assembly of the present invention may also be used in a loading regulator where an actuator can be attached to the diaphragm assembly to move the elastomeric diaphragm ring 38 in order to position the diaphragm for the required flow as will be described with reference to FIG. 14.

Figure 3:
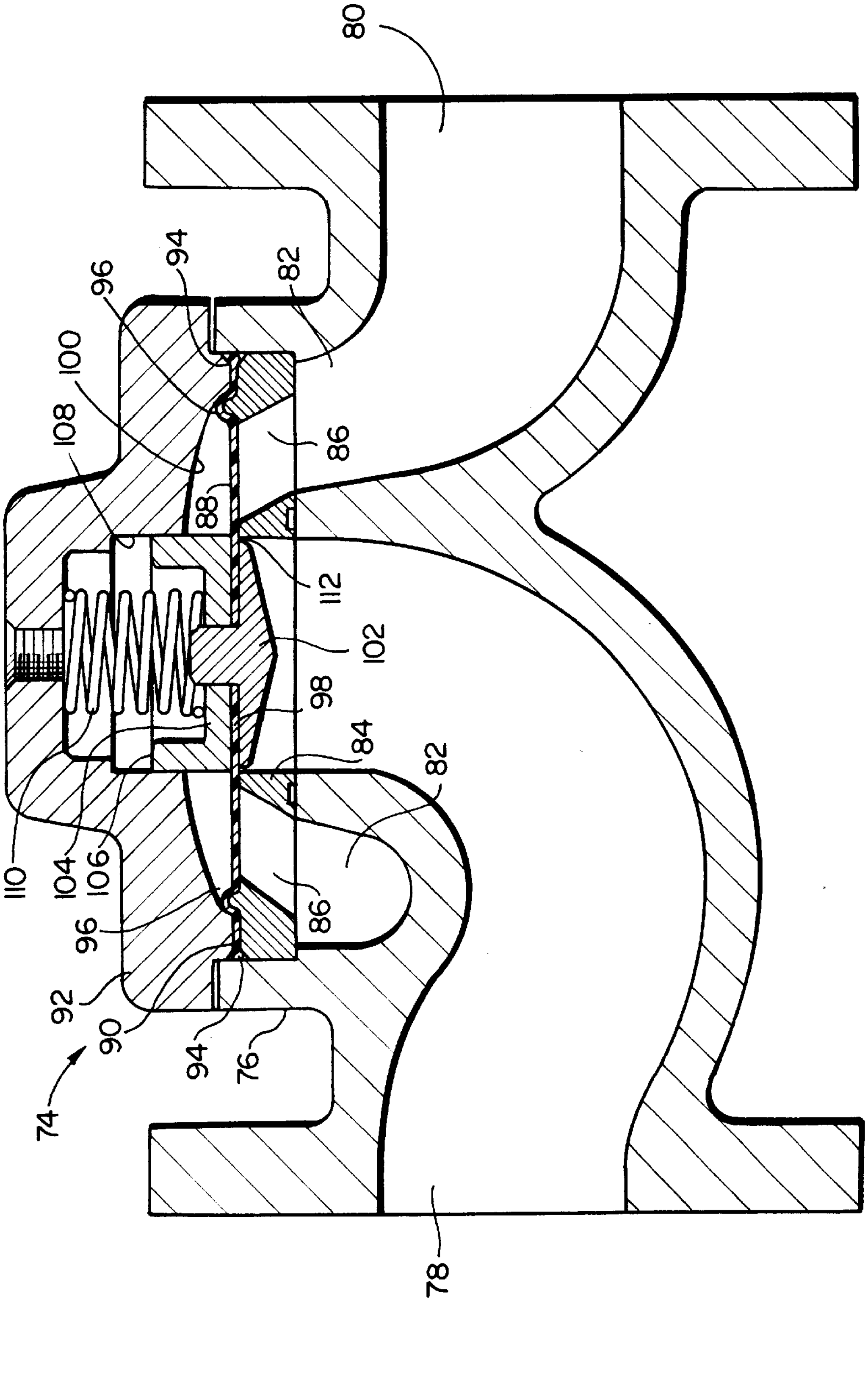
FIG. 3 is a sectional view of an alternative fluid pressure regulator and elastomeric diaphragm assembly in accordance with the present invention.
Figure 4:
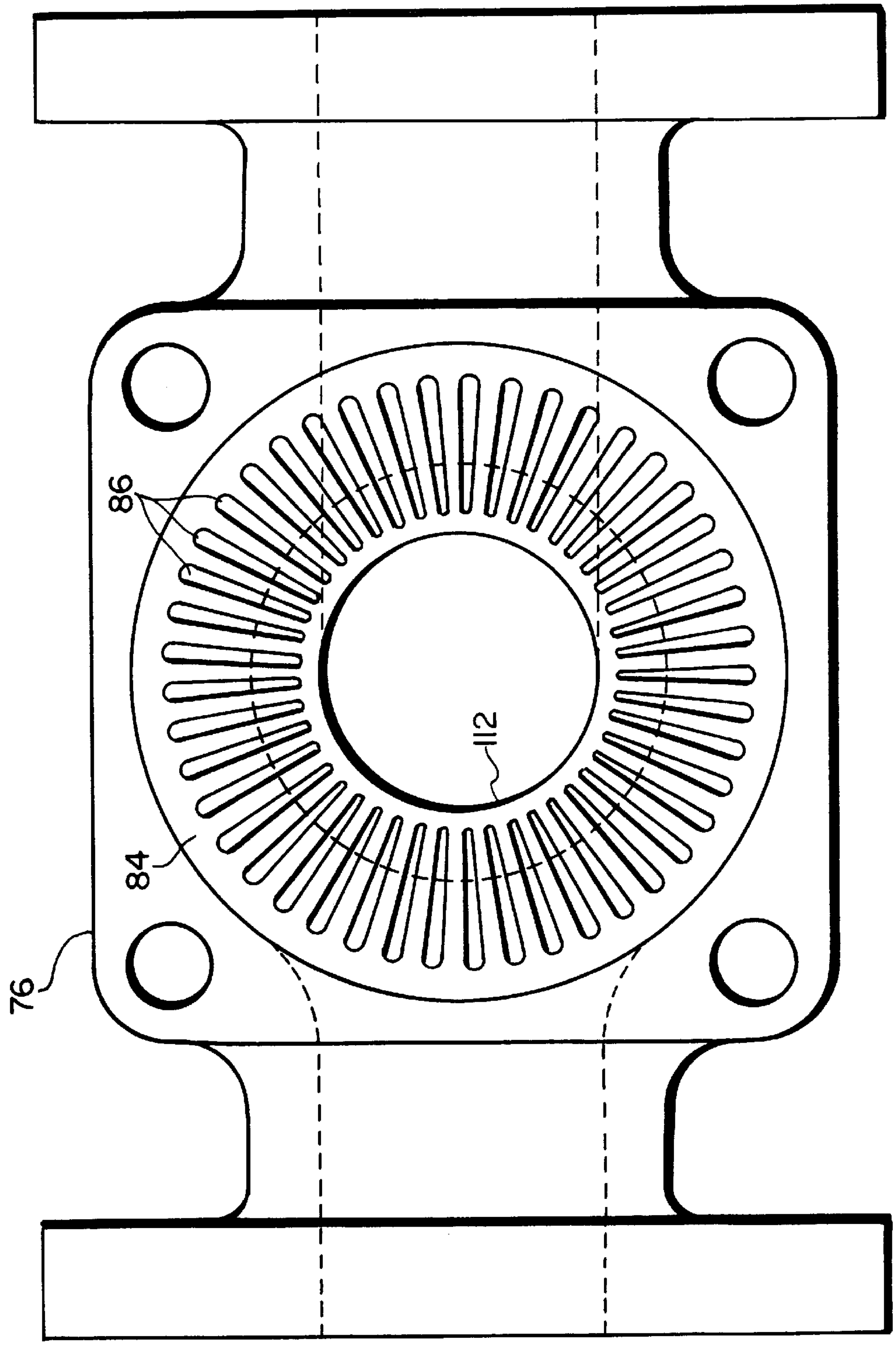
FIG. 4 is a plan view of the regulator of FIG. 3 with the valve bonnet removed to illustrate the cage top.

Referring now to FIGS. 3 and 4, there is illustrated an alternative fluid pressure regulator 74 having a regulator body 76 with a fluid inlet 78, fluid outlet 80 and an interconnecting passageway 82.

FIGS. 3 and 4 illustrate a regulator having this similar components as the regulator shown in FIGS. 1 and 2, i.e., a valve body, a cage mounted in the valve body, and with an elastomeric diaphragm and plug, except that the convolution in the diaphragm element is formed differently.

A cage 84 with apertures in the form of cap openings 86 is mounted within the valve body. Elastomeric diaphragm 88 has a perimeter mounting portion 90 trapped between the cage 84 and a valve bonnet 92 mounted on the valve body. A bead seal 94 acts to maintain the diaphragm within the valve body and to seal the passageway 82 from the atmosphere.

The diaphragm 88 also includes a formed convolution provided by a raised annular ridge 96 between the mounting perimeter 90 and a central diaphragm portion 98. The raised annular ridge 96 straightens as the diaphragm is moved away from the cage top so as to flex to a full opening position adjacent inside surface 100 of the valve bonnet 92 in the same manner as the concave/convex diaphragm of FIG. 1.

The regulator 74 also includes a diaphragm mounting assembly including a lower diaphragm head 102 and an upper diaphragm plate 104 with the central diaphragm portion 98 sandwiched therebetween. As can be seen from FIG. 4, the upper diaphragm plate 104 includes an annular skirt 106 movable between a guide surface 108 in the bonnet 92 such that there is provided a skirt guided movement of the diaphragm. A control spring 110 functions in the same manner as the control spring 66 of FIG. 1. Also, the cage 84 includes a corner seat 112 which cooperates with the diaphragm 98 to shut off the flow of fluid from the inlet 78 to the outlet 80.

Figure 6:
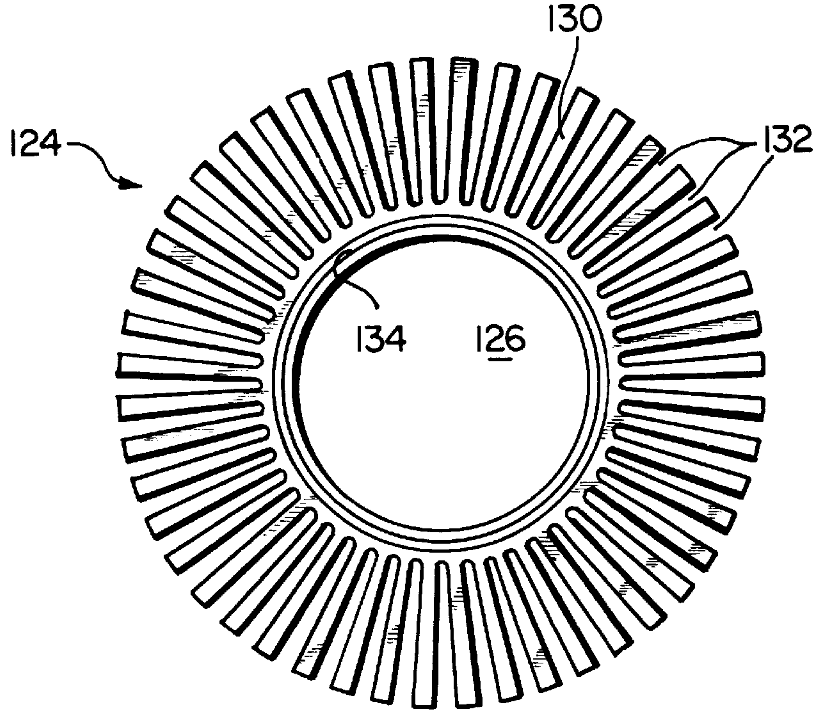
FIG. 6 is a plan view of the regulator cage of FIG. 5 showing the location of a raised sharp seat with respect to the cage cap openings.
Figure 5:
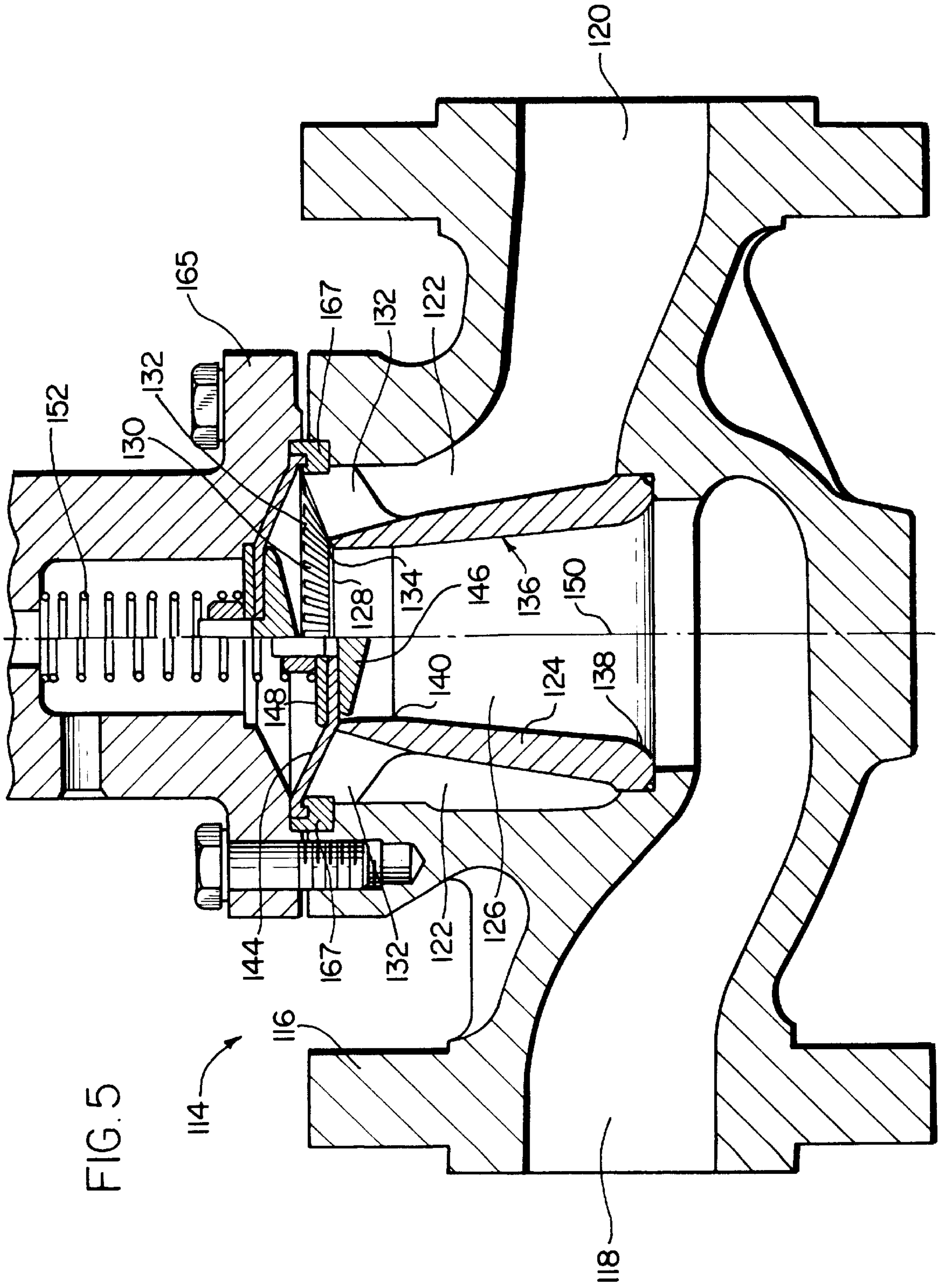
FIG. 5 is a sectional view of a fluid pressure regulator and elastomeric diaphragm assembly in the preferred embodiment of the present invention with opposite sides of the regulator centerline showing respective operational positions for convenience of illustration.

FIGS. 5–7 illustrate a preferred embodiment of a fluid control valve with an elastomeric diaphragm element in accordance with the present invention. In the illustrated regulator 114 there is provided a regulator body 116, having a fluid inlet 118, a fluid outlet 120, and an interconnecting passageway 122. An elongated cage 124 is inserted within the passageway and includes a hollow cage interior 126 leading to a cage outlet top edge 128 at the cage top as shown in FIG. 5. A cap portion 130 at the top end of the cage has a series of cap openings 132 in the form of slot-like apertures which extend through the cap 130 so as to communicate fluid from inlet 118 through the cage interior 126 and out the cage outlet top edge 128 and into the passageway 122 leading to the fluid outlet 120.

The cage 124 also includes a raised annular seat 134 on the cap 130. As shown in FIG. 7, the raised annular seat 134 is in the form of a knife edge to provide a sharp seat and is located on the cap 130 at a position which is intermediate the cage outlet top edge 128 and the cap openings 132. In connection with the embodiment of FIGS. 5–7 a flow diverter configuration has been included in this embodiment so as to enable the seat 134 to be desirably located at a position on the cap 130 which is a region of low turbulence or low velocity i.e., a basically stagnant flow region.

In particular, it may be noted from FIGS. 5 and 7 that the cage 124 includes a lower interior portion 136 of reducing diameter from the cage bottom at 138 to a cage interior area 140. The following cage interior upper portion 142 extending from the area 140 to the cage outlet top edge 128 has a substantially constant diameter. In this configuration the cage interior lower portion 136 and the cage interior upper portion 142 tends to reduce the separation of the fluid flow passing from the cage interior around the cage outlet top edge and on the way to the cap openings. Accordingly, this flow diverter structure enables a more efficient recovery of the fluid flow exiting the top of the cage and before entering the cap openings 132, thereby leading to better regulator stability, particularly at low flow conditions. In addition, the flow diverter enables the desired raised sharp seat 134 to be located at an area of low velocity and turbulence thereby significantly reducing the build-up of contaminants on the seat and seat erosion, and without the need to provide a longer recovery area which decreases the flow capacity as required in prior regulators attempting to solve this problem.

As can be seen from FIGS. 5 and 7, the top surface of cap portion 130 of the cage 124 is in a frustoconical shape. Thus, instead of utilizing a formed convolution in the diaphragm element to obtain a full cage outlet opening, a flat elastomeric diaphragm element 144 is provided. The flat diaphragm 144 is mounted between a lower plug-like diaphragm head 146 and an upper diaphragm plate 148 in a similar manner as described in connection with FIG. 1. The perimeter edge portion of the upper diaphragm plate 148 is sized with respect to the raised sharp seat 134 such that in the closed regulator position shown to the left side of centerline 150 in FIG. 5, there is a reliable seating pressure to securely seat the diaphragm 144 onto the raised sharp seat 134. A spring 152 performs the same function as the spring 66 described in connection with FIG. 1. The plug-like diaphragm head 146 prevents an undesired impingement of particles in the flow stream onto the diaphragm 144 and deflects the flow away from the diaphragm in a manner similar to the embodiments of FIGS. 1, 2 and 3, 4.

FIG. 8 illustrates a cage 154 having an alternative flow diverter. A projecting ledge 156 protrudes into the cage interior 158. A cage interior lower portion 160 decreases in diameter. A cage interior upper portion 162 remains substantially constant in diameter from the ledge 156 to the cage top edge 164. This flow diverter configuration also tends to reduce the flow separation of the fluid as the fluid passes from the cage interior 158 past the cage outlet top edge 164 and to the cap openings 166 to provide the resulting advantages previously described in connection with FIGS. 5–7. It is to be understood that rather than the constant diameter section 162, this cage portion can be curved from ledge 156 to the cage outlet top edge 164. Also, instead of the sharp right angle ledge 156, a more rounded ledge can also be utilized to provide the desired flow diversion to reduce flow separation beyond top edge 164.

A cage retainer 167 is provided for mounting within a ledge in the valve body and maintaining the cage 124 securely in position. Retainer ring 167 also includes a suitable groove for receiving a downward turned perimeter lip of diaphragm 144 (see FIG. 5). Mounting the valve bonnet on the valve body securely maintains the diaphragm, retainer ring and cage in position. Initially, with the diaphragm 144 mounted between the diaphragm head 146 and the plate 148, the elastomeric diaphragm perimeter lip is fitted within the retainer ring. The diaphragm 144 lies flat on the cap portion 130 in a frustoconical shape as shown on the left side of the center line 150 of FIG. 5. Accordingly, the diaphragm is initially flat and when mounted onto the cage adapts to the frustonconical shape of the cap portion 130 as shown in FIG. 5. Also, when the diaphragm is moved away from the cap openings, the diaphragm can flex upwardly to assume a fully open position against an inside surface of the bonnet as illustrated on the right side of center line 150 in FIG. 5.

FIGS. 9 and 10 illustrate an alternative cage retainment ring 168 which includes a plurality of fingers 170 extending radially inwardly from an annular base portion 172. The fingers 170 are adapted to respectively mate and fit within the cap openings 132 of the cage 124 shown in FIG. 6. Thus, for instance, if a full capacity regulator 114 is desired, the retainer ring 167 having a hollow center is used. If then for instance a 50% reduction in flow capacity is desired for the regulator 114, cage retainer ring 167 is removed and replaced with the retaining ring 168 such that the fingers 170 inserted into at least some of the cap openings 132 will reduce the flow capacity of the regulator. This is an advantageous feature when one desires to change the flow capacity of a regulator, in that in prior regulators, several different cages had to be stocked with a respective flow capacity. The prior cage would be removed and replaced with a new cage having the desired flow capacity.

In accordance with the present invention, only a new cage retaining ring 168 having the desired flow capacity needs to be used. Therefore, this only necessitates stocking different flow capacity retainer rings 168 instead of entirely different cages, and without having to remove the cage from the valve body to change the flow capacity.

Figure 11:
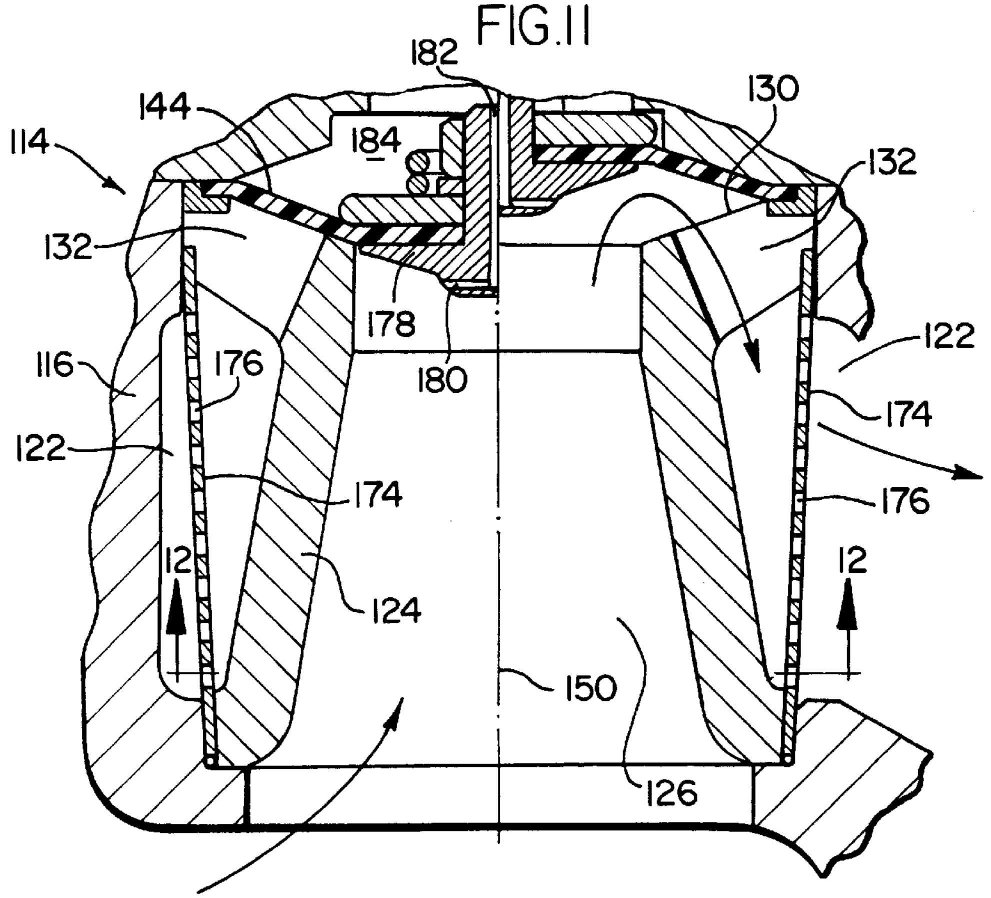
FIG. 11 is a fragmented view of a regulator in accordance with the invention including a perforated flow diffusion member surrounding the cage for noise attenuation and with an alternative diaphragm mounting assembly including passageways for aspirating loading chamber pressure.
Figure 12:
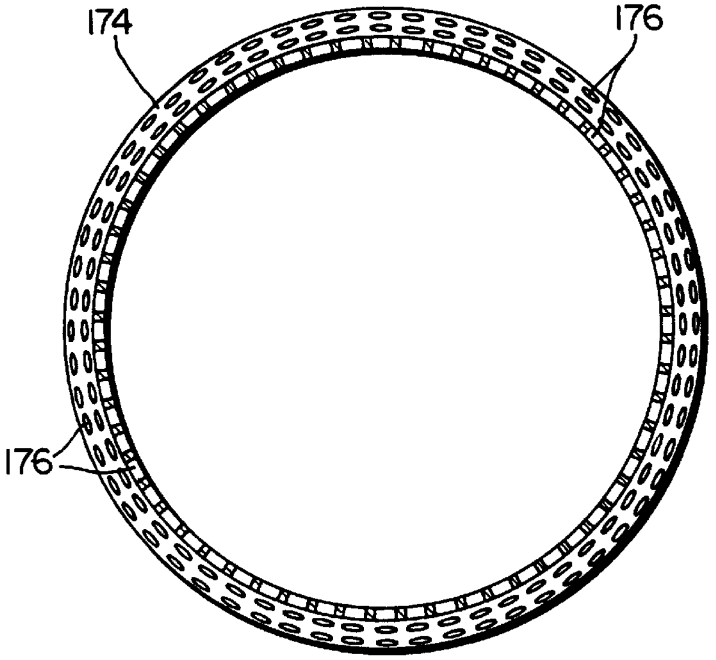
FIG. 12 is a sectional view taken along section line 12—12 of FIG. 11 with the cage eliminated for ease of illustration.

FIGS. 11 and 12 illustrate a regulator containing many of the same components as in the regulator 114 of FIG. 5 according to the present invention, i.e., cage 124, diaphragm 144, and the valve body 116. In addition, a perforated cylindrical member 174 is mounted so as to surround the cage 124 from the cap 130 down to the bottom of the cage 124. Apertures 176 in the cylindrical member 174 enable fluid to pass through the member 174. Accordingly, fluid passing from cage interior 126 on the upstream side passes through the cap openings 132 and the apertures 176 into passageway 122 and finally to the valve outlet 120 on the downstream side. This provides a flow diffuser to reduce noise generated by turbulence. One or more of the perforated cylindrical members 176 can be mounted around the cage 124 depending on the level of attenuation desired.

With reference to FIG. 11, a lower plug-like diaphragm head 178 includes connecting passageways 180 and 182. Passageway 182 extends longitudinally of the centerline 150 and passageway 180 extends horizontally within the diaphragm head 178 so as to intersect with the passageway 182 as shown in FIG. 11. Accordingly, a loading chamber 184 located above the diaphragm 144 is communicated through passageways 182 and 180 to the cage interior 126. Accordingly, when the diaphragm is being moved from the closed to the open position, the loading chamber pressure in chamber 184 can be removed by being aspirated through passageways 182, 180 to the cage interior 126, so as to enable faster operation of the diaphragm and therefore a quicker regulator response time. This aspirator technique is, of course, useful for all of the embodiments of the present invention.

Figure 13:
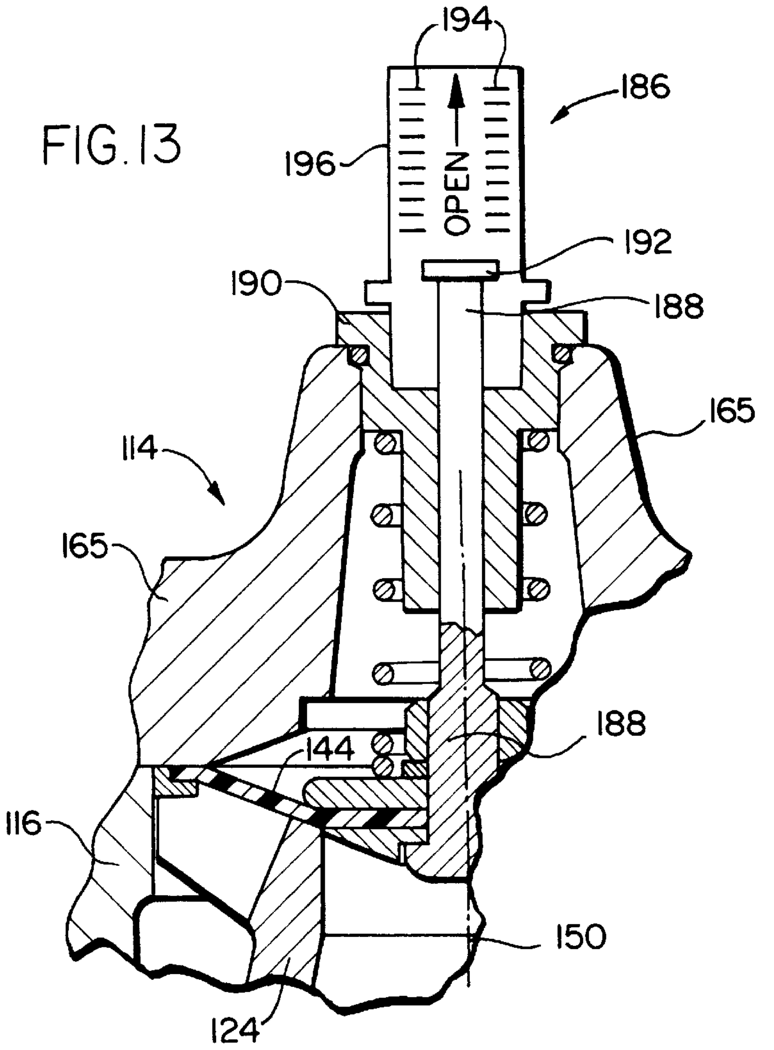
FIG. 13 is a fragmented sectional view illustrating a regulator in accordance with the present invention including a guided valve stem and a travel indicator indicating the position of the valve stem.

FIG. 13 illustrates the incorporation of a travel indicator 186 in the regulator 114 of FIG. 5. Regulator 114 includes a valve stem 188 mounted within the diaphragm mounting assembly. The other portion of valve stem 188 is slidably captured within a guide piece 190 which in turn is threadably engaged within the bonnet 165. Thus, as the diaphragm 144 moves in position, the valve stem 188 is guided within the guide piece 190.

At the top of the valve stem 188 there is provided a marker 192. Position indicators 194 are provided on a scale member 196 which is threadably engaged within the guide piece 190, such that the scales 194 are adjacent and cooperative with the marker 192 on the valve stem. Thus, the travel position of the elastomeric diaphragm 144 from the closed to the open position is indicated by the travel indicator 186 by the position of marker 192 with respect to the scales 194. Also, with the guided valve stem 188 shown in FIG. 13, one could utilize suitable limit switches, microswitches, proximity switches, or other microsensing devices to provide electronic sensing and indication of the valve position.

Figure 14:
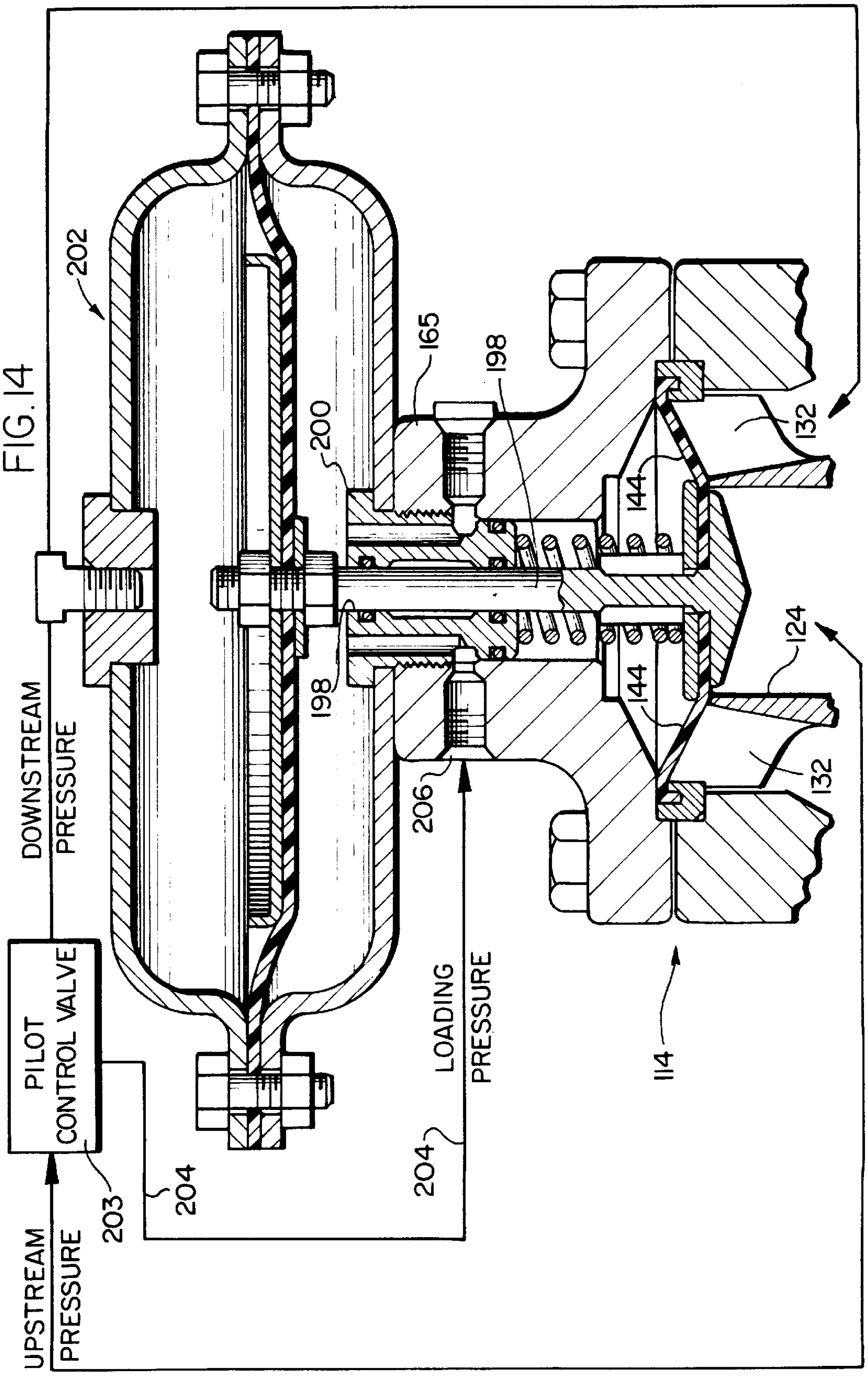
FIG. 14 is a fragmented sectional view illustrating a regulator in accordance with the present invention with a guided valve stem coupling to a valve actuator and being operated by a pilot control valve.

FIG. 14 illustrates the regulator 114 of FIG. 5 with a guided valve stem 198 being guided by a guide piece 200 threadably engaging the bonnet 165. A valve actuator 202 is mechanically coupled to the guided valve stem 198 so as to mechanically actuate the elastomeric diaphragm element 144 toward and away from the cage cap openings 132. An actuating force is supplied through a loading pilot 203 and via a loading pressure 204 to actuator inlet 206. This actuator system could be used for low differential pressure applications.

As an alternative, the regulator 114 may be used with a valve actuator in a self-operated regulator configuration using a control spring to obtain desired control pressure settings.

Figure 15:
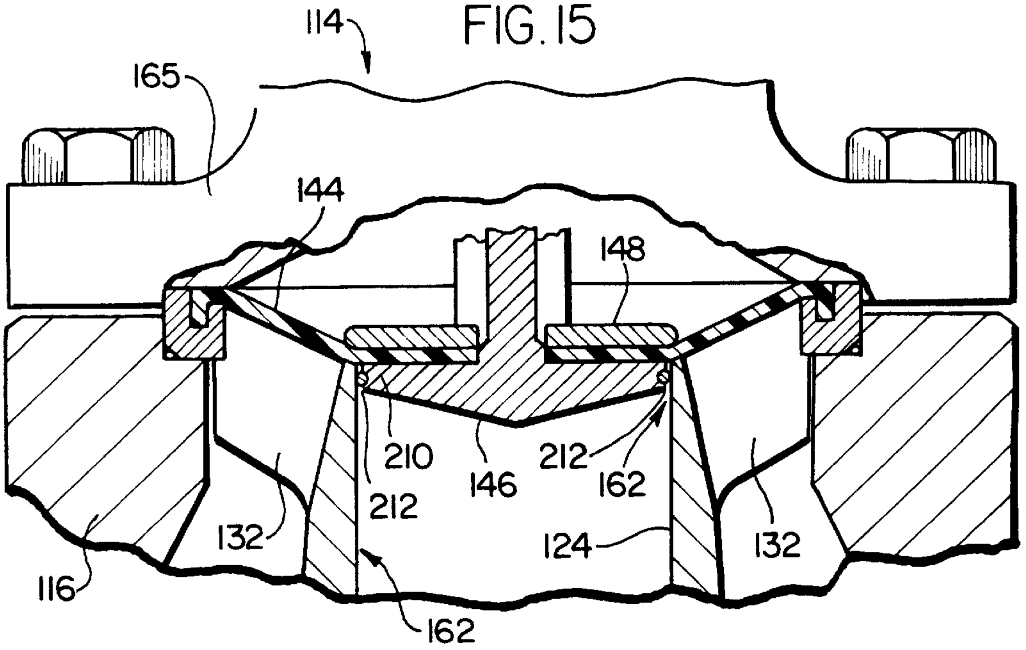
FIG. 15 is a fragmented sectional view of an alternative embodiment regulator with a primary seating plug and a secondary seating diaphragm.

FIG. 15 shows a secondary seat configuration provided for the regulator 114. The lower plug-like diaphragm head 146 includes a resilient annular sealing member, such as an O-ring 210 which is suitably mounted within a groove in the diaphragm head. The O-ring is slightly larger in diameter than the interior diameter of the cage 124. Thus, as the diaphragm head 146 is lowered towards the top of cage 124, the O-ring 210 sealingly engages the cage interior upper portion 162 at an annular seat 212. This provides a primary shut-off for the regulator.

A secondary shut-off is provided by the previously described seating engagement of elastomeric diaphragm 144 at the raised sharp seat in the cap portion of cage 124. The use of a primary and secondary seat aids the reliable shut-off of the regulator and also reduces the seat load required from the regulator spring. In certain circumstances, the elastomeric diaphragm element would not be required to provide any shut-off so that only the O-ring seat 212 would be needed.

To preform a flat elastomeric diaphragm element into the desired frustoconical shape, the flat diaphragm could be trapped between two contoured retainers such as a lower diaphragm head and an upper diaphragm plate to deflect the diaphragm element to the desired configuration. In this case, the diaphragm retainers would be suitably contoured to form the flat diaphragm to the shape desired. This technique would eliminate the need for any special molded parts and also increases the elastomeric compounds which can be used for the diaphragm element.

The foregoing detailed description has been given for clearness of understanding only, and no unnecessary limitations should be understood therefrom, as modifications will be obvious to those skilled in the art.

We claim:

1. A fluid control valve comprising:

a valve body having a fluid inlet, a fluid outlet, and a fluid passageway therebetween;

a cage member having a cage interior for receiving fluid at one cage end and a cap at the other cage end having cap openings in fluid communication with said cage interior;

said cage member mounted within said valve body fluid passageway for passing fluid from said valve body fluid inlet through said cage interior, continuing through said cap openings to said valve body fluid outlet, said fluid exiting out said other cage end and reversing in fluid flow direction to enter said cap openings with said fluid flow tending to separate during the reversal of the fluid flow direction;

a flexible diaphragm mounted in said valve body and flexibly movable from adjacent said cap openings to away from said cap openings in controlling the flow of fluid between said valve body fluid inlet and fluid outlet; and flow diverter means within said cage interior to reduce the separation of said fluid flow in the reversing flow direction while passing between the other cage end and said cap openings so as to reduce the required flow recovery area as the fluid flow exits the other cage end and enters said cap openings.

2. A fluid control valve according to claim 1, wherein said flow diverter means includes a decreasing cage interior volume portion from said one cage end towards the other cage end followed by a substantially constant cage interior volume portion continuing to the other cage end.

3. A fluid control valve according to claim 1, wherein said flow diverter means includes a decreasing cage interior volume portion from said one cage end towards the other cage end followed by a ledge portion having a ledge projecting into the cage interior continuing to the other cage end.

4. A fluid control valve according to claim 3, wherein said ledge portion includes a substantially constant cage interior volume portion.

5. A fluid control valve comprising:

a valve body having a fluid inlet, a fluid outlet, and a fluid passageway therebetween;

a cage member having a cage interior for receiving fluid at one cage end and a cap at the other cage end having cap openings in fluid communication with said cage interior;

said cage member mounted within said valve body fluid passageway for passing fluid from said valve body fluid inlet through said cage interior, continuing through said cap openings to said valve body fluid outlet;

a flexible diaphragm mounted in said valve body and flexibly movable from adjacent said cap openings to away from said cap openings in controlling the flow of fluid between said valve body fluid inlet and fluid outlet;

flow diverter means within said cage interior to reduce the separation of said fluid passing between the other cage end and said cap openings so as to reduce the required flow recovery area as the fluid flow exits the other cage end and enters said cap openings; and a raised seat on said cap between said other cage end and said cap openings for fluid sealingly engaging said diaphragm to reliably prevent fluid flow from said valve body fluid inlet to said fluid outlet.

6. A fluid control valve according to claim 5, including a diaphragm center mounting assembly, and wherein said diaphragm includes a central portion mounted within said diaphragm center mounting assembly, said diaphragm center mounting assembly including a diaphragm plate and spring means on one side of said diaphragm for urging said diaphragm plate to seat said diaphragm on said raised seat.

7. A fluid control valve according to claim 6, wherein said diaphragm center mounting assembly includes a diaphragm head on the other side of said diaphragm having a protruding nose for deflecting said fluid passing through said cage interior.

8. A fluid control valve according to claim 5, including a retaining ring engaging said cap for mounting said cage in said valve body, said retaining ring including flow blocking fingers mating with said cap openings to desirably reduce the flow capacity of said fluid control valve.

9. A fluid control valve according to claim 5, including a perforated member surrounding said cage and intermediate the fluid flow from said cap openings to said valve body fluid outlet for attenuating noise in said fluid flow.

10. A fluid control valve according to claim 5, including a valve stem engageably coupled to the center of said diaphragm for moving said diaphragm towards and away from said cap openings, and stem guide means in said valve body for guiding said valve stem during movement thereof.

11. A fluid control valve according to claim 10, including a travel indicator mounted to said valve body and cooperating with said valve stem to indicate the opening position of said valve.

12. A fluid control valve according to claim 10, including a valve actuator coupled to said valve stem for operatively moving said valve stem.

13. A fluid control valve according to claim 5, including aspirator passageways for communicating opposite sides of said flexible diaphragm to each other.

14. A fluid control valve according to claim 5, including a diaphragm mounting assembly for mounting said diaphragm in said valve body to define a loading chamber on one side of said diaphragm, and aspirator passageways extending through said diaphragm mounting means for communicating said loading chamber to the opposite side of said diaphragm.

15. A fluid control valve according to claim 7, including a resilient sealing member mounted in said diaphragm head for engaging said cage at said other cage end to provide a primary seat in reliably preventing fluid flow from said valve body fluid inlet to said fluid outlet.

16. A fluid control valve according to claim 5, wherein said raised seat is located at a stagnant flow area on said cap.

17. A fluid control valve according to claim 16, wherein said raised seat is formed with a sharp seating edge for engaging said diaphragm.

18. In a fluid pressure regulator having a regulator body with a fluid flow path through the regulator body controlled by a flexible diaphragm, and a cage member mounted within the regulator body adjacent the diaphragm for reversing the fluid flow path thereby tending to separate the fluid flow and presenting a pressure throttling area in the fluid flow path for pressure regulating the flow, the improvement comprising a flow diverter in the fluid flow path before the pressure throttling area to reduce fluid flow separation in the reversing fluid flow path in the vicinity of the pressure throttling area.

19. The fluid pressure regulator according to claim 18, including a raised seat located intermediate the flow diverter and the pressure throttling area and in a position of stagnant fluid flow to reduce the build-up of contaminants on said raised seat.

20. The fluid pressure regulator according to claim 19, wherein said raised seat is formed with a sharp seating edge.

21. The fluid pressure regulator according to claim 18, including a valve stem coupled for movement with said diaphragm, and a travel indicator mounted to said regulator body and cooperating with said valve stem to indicate the opening position of said regulator.

* * * * *